United States Patent [19]
Mermelstein

[11] Patent Number: 6,016,196
[45] Date of Patent: Jan. 18, 2000

[54] MULTIPLE BEAM PAIR OPTICAL IMAGING

[75] Inventor: Michael S. Mermelstein, Cambridge, Mass.

[73] Assignee: Massachusetts Institute of Technology, Cambridge, Mass.

[21] Appl. No.: 08/877,519

[22] Filed: Jun. 17, 1997

[51] Int. Cl.$^7$ ...................................................... G01B 9/02
[52] U.S. Cl. .......................................... 356/345; 356/356
[58] Field of Search .................................. 356/35.5, 374, 356/345, 359, 360

[56] References Cited

U.S. PATENT DOCUMENTS

| | | | |
|---|---|---|---|
| 4,584,484 | 4/1986 | Hutchin | ..................................... 250/550 |
| 5,384,573 | 1/1995 | Turpin . | |
| 5,870,191 | 2/1999 | Shirley et al. | ........................... 359/345 |

OTHER PUBLICATIONS

T. M. Crawford et al., "Novel Fringe Scanning/Fourier Transform Method of Synthetic Imaging", NTIS Accession No. DE93018936/XAB, Report No. EGG–M–93041 (1993).

H. P. Gush, "Optical Imaging Using Aperture Synthesis", *J. Opt. Soc. Am.* 69(1): 187–191 (1979).

M. Rajadhyaksha et al., "Confocal Laser Microscope Images Tissue In Vivo", *Laser Focus World* pp. 119–127 (Feb. 1997).

D. V. Baranov et al., "Differential Phase Heterodyne Microscope Using an Integrated Optics Modulator" *Tech. Phys. Lett.* 19(9): 552–553 (1993).

J. Lorinicik et al., "Scanning Scattering Microscope for Surface Microtopography and Defect Imaging" *J. Vac. Sci. Technol. B* 14(4): 2417–2413 (1996).

International Search Report in corresponding PCT Application No. PCT/US98/11604.

*Primary Examiner*—Robert H. Kim
*Assistant Examiner*—Andrew H. Lee
*Attorney, Agent, or Firm*—Testa, Hurwitz & Thibeault, LLP

[57] ABSTRACT

A multiple beam pair optical imaging apparatus includes a multiple beam pair generator and an illuminator. The illuminator is provided for illuminating an object with a first illumination comprising an interference pattern of modulated basis vectors arising from the multiple beam pairs. A detector is provided for detecting a characteristic of a second illumination received from the object in response to the first illumination. A processor is provided in electrical communication with the detector that calculates the coefficients of interaction of the object with the modulated basis vectors in response to the characteristic of the second illumination and the pattern of the modulated basis vectors.

45 Claims, 5 Drawing Sheets

MULTIPLE BEAM PAIR OPTICAL IMAGING

GOVERNMENT SUPPORT

This invention was made with government support under Contract Number F19628-95-C-0002 awarded by the Air Force. The government has certain rights in the invention.

FIELD OF THE INVENTION

The invention relates generally to the field of image sensing. In particular, the invention relates to methods and apparatus for image sensing and projection using optical scanning.

BACKGROUND OF THE INVENTION

Fourier transform optical tomographic imaging scanners use optical heterodyne techniques to observe the Fourier transform of a cross-section of a sample. Such scanners are useful for many applications where it is desirable to determine shape information of structures on or within samples. Optical tomographic scanners can be used for measuring features on opaque two-dimensional surfaces. For example, optical tomographic scanners can be used to determine fabrication tolerances in semiconductor devices. Optical tomographic scanners can also be used for measuring three dimensional shape information within a translucent sample. The shape information may be the location of fluorescent dye molecules, light absorbing features or scattering centers in the sample. For example, optical tomographic scanners can be used to produce volumetric images of biological samples.

In U.S. Pat. No. 4,584,484, a microscope is disclosed that exposes a localized sample to a moving sinusoidal interference fringe pattern that is produced by the interference of wave energy directed at the sample. Incident coherent light is directed at a sample and at a mirror. A resulting fringe pattern is produced from the interference between the reflected light and the incident light. The spatial frequency of fringes in the fringe pattern is a direct function of the angle of the incident light with respect to the sample. The spatial frequency varies between a first and second value during the motion or passage of the fringe pattern over the sample in a first direction.

The fringe patterns are passed over the sample multiple times. During each pass of the moving fringe pattern over the sample, a set of signals are recorded that are proportional to the intensity of the wave energy transmitted from the sample (by reflection or transmission). The direction of relative motion between the image of the moving fringe pattern and the sample is slightly changed by rotating the sample or by rotating the beam. Another set of signals is then recorded that are proportional to the intensity of the wave energy transmitted from the sample.

This process is repeated until "Fourier slices" in a considerable number of directions are generated and recorded. The recorded data is thereafter processed by extracting phase and amplitude values of at least some of the Fourier components of the recorded signals. These Fourier components contain information equivalent to the Fourier components of the image of the physical specimen measured at high resolution. The optical image of the sample or scene under examination is reconstructed by performing Fourier transforms on the Fourier components.

Prior art optical scanning instruments require the use of at least one degree of mechanical rotation that must be stepped through a large number of pairs of angular positions. This results in relatively long measurement acquisition times.

SUMMARY OF THE INVENTION

It is therefore a principal object of this invention to improve the speed of optical scanning instruments. It is another principal object to improve the a depth of focus, field of view, working distance, and distortion of optical microscopes. It is another object of this invention to reduce the number of optical components and to simplify the design of optical microscopes.

A principal discovery of the present invention is that optical scanning can be accomplished by a multiple beam-pair illumination technique that does not require beam steering or mechanical rotation.

Accordingly, the present invention features a method for providing metrologic information about an object. The method includes illuminating the object with a first illumination comprising a pattern of modulated basis vectors. The object may be illuminated with an interference pattern arising from at least two beam pairs. The object may be illuminated by time varying the modulated basis vectors. Time varying the modulated basis vectors may be accomplished by amplitude, polarization, or phase modulating the modulated basis vectors.

The method also includes detecting a characteristic of a second illumination received from the object in response to the first illumination. The second illumination may be fluorescence. The characteristic may be detected by detecting the first illumination scattered or transmitted by the object. The characteristic may also be detected by detecting the second illumination generated by the object. The characteristic detected may be optical intensity, polarization, or phase.

In addition, the method may include calculating the coefficients of interaction of the object with the modulated basis vectors in response to the characteristic of the second illumination and the pattern of the modulated basis vectors. The method may also include reconstructing an image of the object from the coefficients of interaction of the object with the modulated basis vectors. The method may also include determining a parameter of the object from the coefficients of interaction of the object with the modulated basis vectors. The coefficients of interaction of the object with the modulated basis vectors may be calculated by a cross-correlation. The cross-correlation may be performed by a matched filter. The coefficients of interaction of the object with the modulated basis vectors may also be calculated by a transform or a matrix calculation.

The present invention also features an apparatus for providing metrologic information about an object. The apparatus includes an illuminator for illuminating the object with a first illumination comprising a pattern of modulated basis vectors. The illuminator may illuminate the object with at least two beam pairs of illumination. The illuminator may include a modulator that time varies the modulated basis vectors. The modulator may amplitude, polarization, or phase modulate the modulated basis vectors.

The apparatus also includes a detector for detecting a characteristic of a second illumination received from the object in response to the first illumination. The detector may comprise a plurality of detecting units that detect the second illumination from a plurality of regions within the object. The second illumination may comprise fluorescence radiation. The second illumination may be the first illumination scattered by the object, the first illumination transmitted by the object, or illumination generated by the object.

In addition, the apparatus includes a processor in electrical communication with the detector that calculates the coefficients of interaction of the object with the modulated basis vectors in response to the characteristic of the second illumination and the pattern of the modulated basis vectors. The processor may reconstruct an image of the object from the coefficients of interaction of the object with the modulated basis vectors. The processor may calculate the coefficients of interaction of the object with the modulated basis vectors using a cross-correlator. The cross-correlator may be a matched filter. The processor may calculate the coefficients of interaction of the object with the modulated basis vectors using an inverse transform apparatus.

The present invention also features a method of generating a second pattern of modulated basis vectors at a location. The method includes providing a first pattern of modulated basis vectors. The method also includes the step of modulating the first pattern of modulated basis vectors in response to the first pattern of modulated basis vectors and predetermined criteria to generate the second pattern of modulated basis vectors.

The method may include the step of combining a plurality of the second pattern of modulated basis vectors to form an image specified by the predetermined criteria. The second pattern of modulated basis vectors may be a modulated copy of the first pattern scaled by a magnification coefficient. Also, a plurality of the second patterns may be combined to form a scaled image of the object.

In addition, the method may include illuminating an object with a first illumination comprising the first pattern of modulated basis vectors and detecting a characteristic of a second illumination received from the object. The step of modulating the first pattern of modulated basis vectors is in response to the first pattern of modulated basis vectors and the detected characteristic of the second illumination. The step of detecting the characteristic of the second illumination may include detecting the phase, intensity, or polarization of the second illumination.

The present invention also features an apparatus for generating a second pattern of modulated basis vectors at a location. The apparatus includes an illuminator that provides a first pattern of modulated basis vectors. The apparatus also includes a modulator that modulates the first pattern of modulated basis vectors in response to the first pattern of modulated basis vectors and predetermined criteria to generate the second pattern of modulated basis vectors. The apparatus may include a receiver that receives a plurality of the patterns. The receiver may be a photo-sensitive chemical receiver or a detector array.

The apparatus may include a beamsplitter that illuminates an object with a portion of the first illumination comprising the first pattern of modulated basis vectors. The apparatus may also include a detector for detecting a characteristic of a second illumination received from the object. The modulator modulates the first pattern of modulated basis vectors is in response to the first pattern of modulated basis vectors and the detected characteristic of the second illumination.

BRIEF DESCRIPTION OF THE DRAWINGS

This invention is described with particularity in the appended claims. The above and further advantages of this invention may be better understood by referring to the following description taken in conjunction with the accompanying drawings, in which:

DETAILED DESCRIPTION

Figure 1:
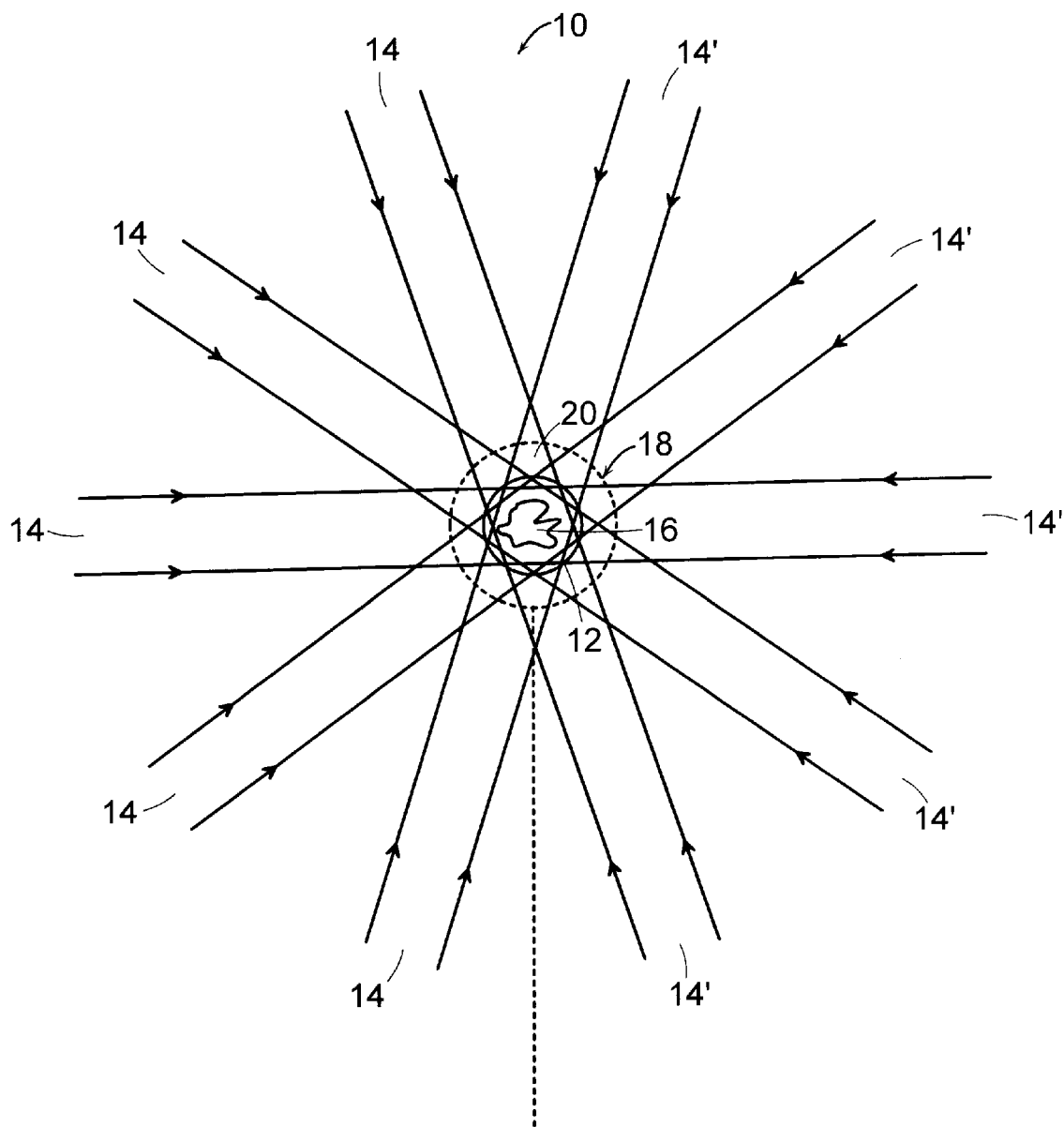
FIG. 1 illustrates one embodiment of a multiple beam pair optical scanner.

FIG. 1 illustrates one embodiment of a multiple beam pair optical scanner. The scanner is advantageous because it allows for parallel data acquisition which greatly enhances the acquisition speed of the scan. For scanners constructed with n beams, the degree of parallel data acquisition and, therefore, the degree of acquisition speed enhancement over known optical scanner, increases by an order of n squared. This assumes that the acquisition speed of the known optical scanners is limited by the speed of mechanical rotation of the sample or of a single beam pair.

The multiple beam pair optical scanner 10, in one embodiment, comprises an arc 12 of n source beams, generally 14, directed at a sample 16 where n is equal to ten and the arc 12 is a circle. Each of the n source beams 14 may have a different phase sequence or a different optical frequency. The phase sequence or frequency difference between each pair of the n source beams 14, 14' is chosen to be unique among the phase sequence or frequency difference between the other pairs of the n source beams 14. The n source beams 14 overlap in a volume of space 20. A detector 18 detects a signal containing information from each of the multiple beam pairs within the arc 12 that is encoded with a unique phase sequence or carrier frequency which corresponds to the phase sequence or frequency difference of that pair.

The detector signal of the multiple beam pair optical scanner 10 using n source beams 14 passing through a volume of space 20 where the n beams 14 overlap and interact with the sample 16 can be calculated in the following way. Assuming that the n source beams 14 have unit amplitude and have direction vectors, $\vec{k}$, linear polarization in the $\hat{p}$ direction, optical frequency, $\omega$, and optical phase as a function of time, $\phi(t)$, the electric field of one of the n beams 14 can be represented as:

$$\vec{E} = \cos(\vec{k} \cdot \vec{r} - \omega t + \phi(t))\hat{p}.$$

The electric field in the space 20 where the n beams 14 overlap is the sum of the n fields:

$$\vec{E}_{overlap} = \sum_{l=1}^{n} \vec{E}_l$$

$$= \sum_{l=1}^{n} \cos(\vec{k}_l \cdot \vec{r} - \omega_l t + \phi_l(t))\hat{p}_l.$$

The intensity in the space 20 where the n beams 20 overlap is the square of the electric field $$I = |\vec{E}_{overlap}|^2 = \vec{E}_{overlap} \cdot \vec{E}_{overlap}$$

-continued $$= \left[\sum_{l=1}^{n} \cos(\vec{k}_l \cdot \vec{r} - \omega_l t + \phi_l(t))\hat{p}_l\right] \cdot \left[\sum_{m=1}^{n} \cos(\vec{k}_m \cdot \vec{r} - \omega_m t + \phi_m(t))\hat{p}_m\right]$$

$$= \sum_{l=1}^{n}\sum_{m=1}^{n} \cos(\vec{k}_l \cdot \vec{r} - \omega_l t + \phi_l(t))\cos(\vec{k}_m \cdot \vec{r} - \omega_m t + \phi_m(t))\hat{p}_l \cdot \hat{p}_m$$

$$= \sum_{l=1}^{n}\sum_{m=1}^{n} \frac{1}{2}[\cos((\vec{k}_l + \vec{k}_m) \cdot \vec{r} - (\omega_l + \omega_m)t + (\phi_l(t) + \phi_m(t))) +$$

optical phase difference of the pair of beams that produced it. The modulation of a given fringe pattern is $\hat{p}_l \cdot \hat{p}_m$ and will be taken to be one for simplicity.

The signal of detector 18, T, positioned to receive light which has interacted with a region of the sample 16 is the integral over the region 20 of the product of a contrast function representing the sample, $C(\vec{r})$ and the intensity, I.

$$T = \int C(\vec{r})I(\vec{r})d\vec{r}.$$

$$T = \int C(\vec{r})\left[\frac{n}{2} + \sum_{l=1}^{n}\sum_{m=l+1}^{n}\cos(\vec{k}_{lm} \cdot \vec{r} + \phi_{lm}(t))\right]d\vec{r}$$

$$= \frac{n}{2}\int C(\vec{r})d\vec{r} + \int C(\vec{r})\left[\sum_{l=1}^{n}\sum_{m=l+1}^{n}\cos(\vec{k}_{lm} \cdot \vec{r} + \phi_{lm}(t))\right]d\vec{r}$$

$$= \underbrace{\frac{n}{2}\int C(\vec{r})d\vec{r}}_{A} +$$

$$\underbrace{\sum_{l=1}^{n}\sum_{m=l+1}^{n}\left[\overbrace{\cos(\phi_{lm}(t))}^{C}\overbrace{\int C(\vec{r})\cos(\vec{k}_{lm} \cdot \vec{r})d\vec{r}}^{D} - \overbrace{\sin(\phi_{lm}(t))}^{E}\overbrace{\int C(\vec{r})\sin(\vec{k}_{lm} \cdot \vec{r})d\vec{r}}^{F}\right]}_{B}.$$

-continued $$\cos((\vec{k}_l - \vec{k}_m) \cdot \vec{r} - (\omega_l + \omega_m)t + (\phi_l(t) - \phi_m(t)))]\hat{p}_l \cdot \hat{p}_m.$$

Simplifying the expression for the intensity in the space 20 where the n beams 14 overlap by including the optical frequency differences in the phase function, and assuming that the first cosine term contributes a zero time-average, the result is $$I = \sum_{l=1}^{n}\sum_{m=1}^{n} \frac{1}{2}[0 + \cos((\vec{k}_l - \vec{k}_m) \cdot \vec{r} + (\phi_l(t) - \phi_m(t)))]\hat{p}_l \cdot \hat{p}_m.$$

Rearranging the double-sum into the case with l equal to m and the case with l not equal to m, and exchanging l and m in those cases with l>m results in $$I = \sum_{l=1}^{n} \frac{1}{2}\cos(0) + \sum_{l=1}^{n}\sum_{m=l+1}^{n} \frac{1}{2}[\cos((\vec{k}_l - \vec{k}_m) \cdot \vec{r} + (\phi_l(t) - \phi_m(t))) +$$

$$\cos((\vec{k}_m - \vec{k}_l) \cdot \vec{r} + (\phi_m(t) - \phi_l(t)))]\hat{p}_l \cdot \hat{p}_m.$$

Renaming $\vec{k}_{lm} \equiv (\vec{k}_l - \vec{k}_m)$, and $\phi_{lm}(t) \equiv (\phi_l(t) - \phi_m(t))$, and simplifying result in $$I = \frac{n}{2} + \sum_{l=1}^{n}\sum_{m=l+1}^{n} \cos(\vec{k}_{lm} \cdot \vec{r} + \phi_{lm}(t))\hat{p}_l \cdot \hat{p}_m.$$

Thus, the resulting intensity in the space 20 where the n beams 14 overlap can be represented as a speckle intensity pattern that is a combination of a constant term and $n(n-1)/2$ spatial fringe patterns whose spatial phase is given by the Thus, the detector signal, T, of the multiple beam pair optical scanner using n source beams 14 passing through a volume of space 20 where the n beams 14 overlap and interact with the sample 16 is the sum of a constant term (part A) and a time-dependent double-sum (part B). The double-sum in part B enumerates every pair of source beams 14. For each of those pairs, a contribution to the total signal is made by the cosine transform coefficient of the contrast function $C(\vec{r})$ at the vector spatial frequency synthesized by $\cos(\vec{k}_{lm} \cdot \vec{r})$ (part D) modulated by a time-dependent encoder (part C), and the negative of the sine transform coefficient of the contrast function $C(\vec{r})$ at the vector spatial frequency synthesized by $\sin(\vec{k}_{lm} \cdot \vec{r})$ (part F) modulated by a different encoder (part E).

Figure 2:
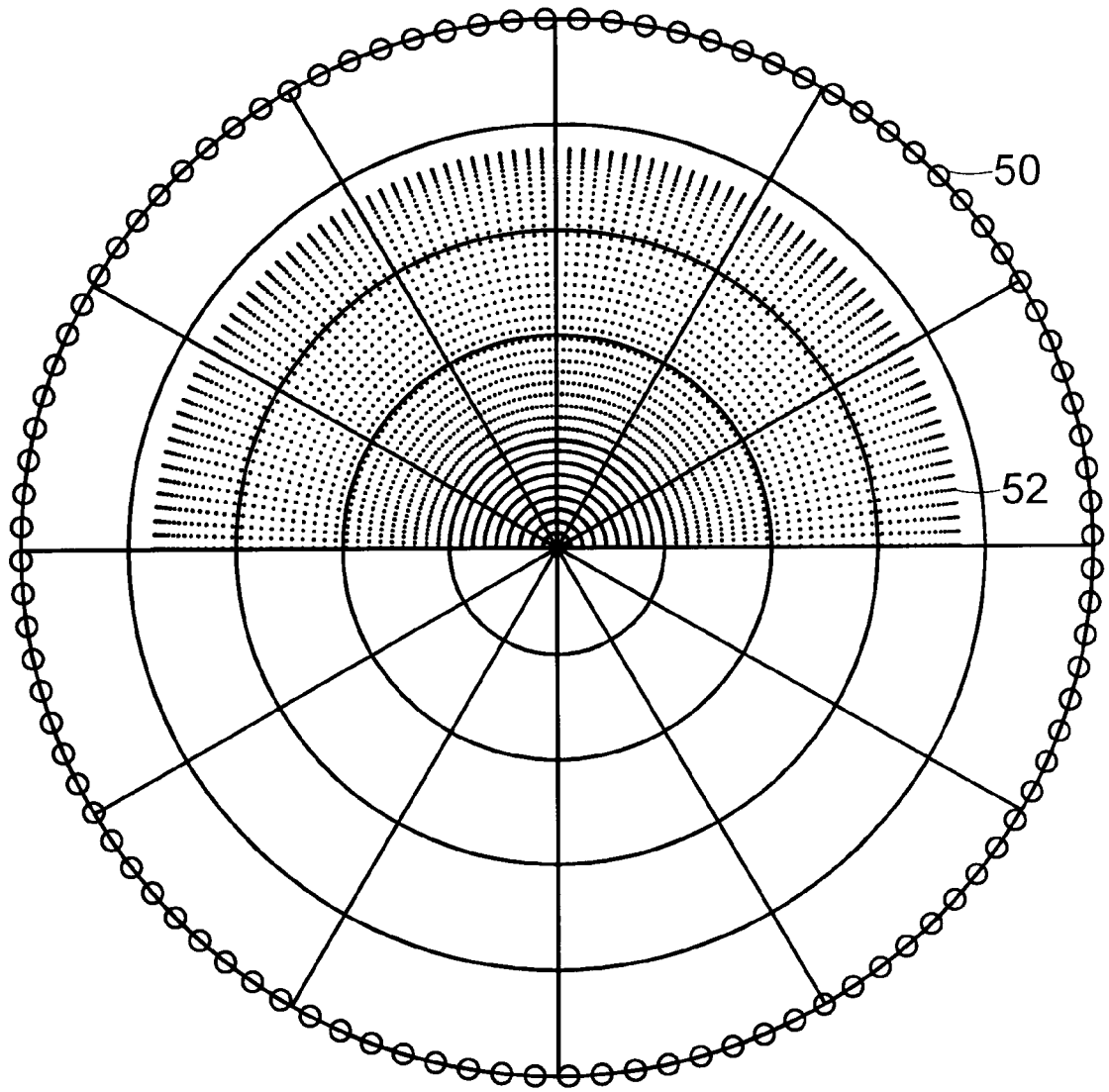
FIG. 2 illustrates the positions of Fourier samples in the case of 99 beams entering into a sample with an elevation angle of 45 degrees from the sample-plane.

FIG. 2 illustrates the position of Fourier samples in the case of 99 beams entering into a sample with an elevation angle of 45 degrees from the sample-plane. The beams are represented by 99 evenly spaced circles 50. There are also 4,851 dots 52 representing the vector spatial frequency of the fringe pattern made by a given pair of beams.

For each pair of beams, a Fourier sample arises at the average angle of the beam pair. The spatial frequency, f, of the Fourier sample is determined by the angle between the two beams, θ, and the refractive index, N, of the medium in which the fringes are made. In the approximation that both beams have essentially the same wavelength, λ, the spatial frequency can be represented as:

$$f \approx \frac{2N\sin\left(\frac{\theta}{2}\right)}{\lambda}.$$

The Fourier samples in FIG. 2 are three dimensional samples which lie in the plane of the range dimension. No range information is encoded by these samples, and the depth of field of the instrument is limited only by the beam diameter. To obtain three dimensional data from the optical scanner, two or more view-angles can be taken with a two-dimensional scanner and combined using a tomographic algorithm. Alternatively, the multiple beam pair optical scanner illustrated in FIG. 1 can be modified so that the source beams enter the specimen from a variety of elevation angles.

The n beams 14 can be modulated by numerous techniques. One technique is to modulate the n beams 14 with different frequency shifts from a reference laser. The frequency differences between all pairs of the n beams 14 is chosen to be unique. The n beams 14 with different frequency shifts can be generated by using a single-mode laser coupled to a plurality of acoustic-optic modulators (AOM).

Spread spectrum encoding can also be used to modulate the n beams 14. Spread spectrum is a well known technique for utilizing the bandwidth of a communication system. Spread spectrum is a means of signal transmission where the signal occupies a bandwidth in excess of the minimum necessary to send the information. The band spread is accomplished by means of a code that is independent of the data. A synchronized reception with the code at the receiver is used for despreading and subsequent data recovery. Spread-spectrum encoding is advantageous because it can be implemented by using only a single laser with a few additional components.

Using spread-spectrum encoding, each of the n beams 14 are generated with optical phase, $\phi_l(t)$, that at any given time, is statistically independent of the optical phase of any other beam. The difference in phase between pairs of the n beams 14 $\phi_{lm}(t)$'s is also statistically independent of the difference in phase between pairs of any other of the n beams 14.

It is well known in the art that spread-spectrum communications theory predicts a certain signal-to-noise ratio (SNR) for a given frequency-spread transmitter in an environment of many other frequency-spread transmitters. Using spread spectrum encoding to modulate the n beams 14 in the present invention is advantageous because all of the transmitters have known encoding seeds. Therefore, in theory, there are no numerical or physical sources of error in the encoding process. The Fourier coefficients can be extracted directly from the detector signal, T. In practice, the SNR will be reduced by electrical noise from the detector 20, round-off errors from signal digitization, and laser speckle noise in the measurement.

Speckle noise in the measurement may be the most significant source of measurement error in some embodiments of this invention. The fraction of uncertainty, U, in a measurement due to speckle noise depends on the wavelength, $\lambda$, the diameter of the illuminated patch of surface being measured, d, and the numerical aperture of the collecting optic, N.A.:

$$U = \frac{\lambda}{2d\,N.A.}.$$

Therefore, it is desirable for multiple beam pair optical scanner to use shorter wavelengths, $\lambda$, and larger diameter illuminated patches and numerical apertures.

The n beams 14 can be generated by delaying copies of a single input beam having a uniformly random phase distribution when sampled on a time interval. The copies of the input beam are delayed by at least the sampling time interval to ensure that they also have uniformly random and independent phase distributions. There are numerous method for delaying copies of a single input beam. For example, a spool of fiber with multiple tap lines can be used.

Figure 3:
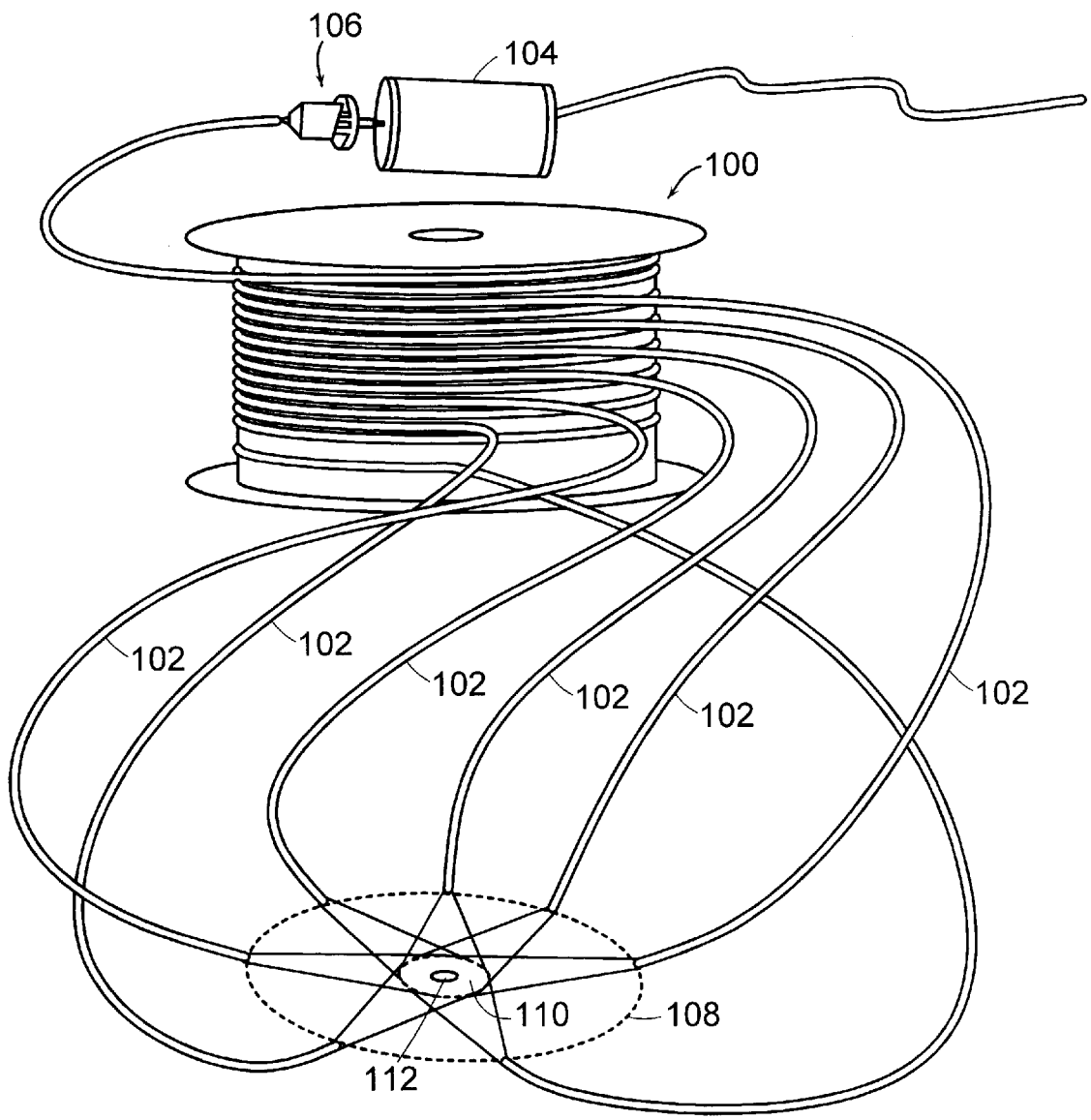
FIG. 3 illustrates an apparatus for delaying copies of a single input beam using a spool of fiber with multiple taps at even spacing.

FIG. 3 illustrates an apparatus for delaying copies of a single input beam using a spool of fiber 100 with multiple tap lines 102 at even spacing. A laser 104 such as a diode laser is coupled into a spool of optical fiber 100. A microscope objective 106 or a lens can be used to couple the laser 104 into the spool of optical fiber 100. The tap lines 102 are fixed to a ring 108 so that light from each of the tap lines 102 is directed into a central region of overlap 110 where a sample 112 is positioned.

There are numerous other techniques for creating delayed copies of a single input beam. For example, an optical cavity with two concave spherical mirrors and a graded beamsplitter can be used to create the delayed copies. Such a cavity creates n substantially parallel beams that are delayed by a multiple of the cavity length. The cavity may be encapsulated in an evacuated tube in order to eliminate the effects of turbulence. The delayed beams emerge from the cavity in a circle and can be directed into a central sample region by optics external to the cavity. The external optics may be submerged in water or an immersion oil to boost resolution or to simplify light-coupling into the sample.

The values of the time dependent encoders in the detector signal, T, are determined from the phase differences of the n beams 14. There are numerous methods for determining the phase differences of the n beams 14. For example, the input beam may be generated by phase modulating a carrier source beam with a known phase signal. The phase differences of the n beams 14 and, therefore, the values of the time dependent encoders can be determined directly from the phase of the input beam.

Alternatively, a reference interferometer can be used to measure the phase differences of the n beams 14. Two detectors placed in quadrature on the reference fringe pattern created by a pair of the n beams 14 propagating in the reference interferometer can be used to determine the phase difference of the pair of the n beams 14 and, therefore, the values of the time dependent encoders. If a delay system is used, the phase differences of the n beams 14 and the values of the time dependent encoders are determined. A pinhole detector can be used to provide phase reference information about the n beams 14.

Figure 4:
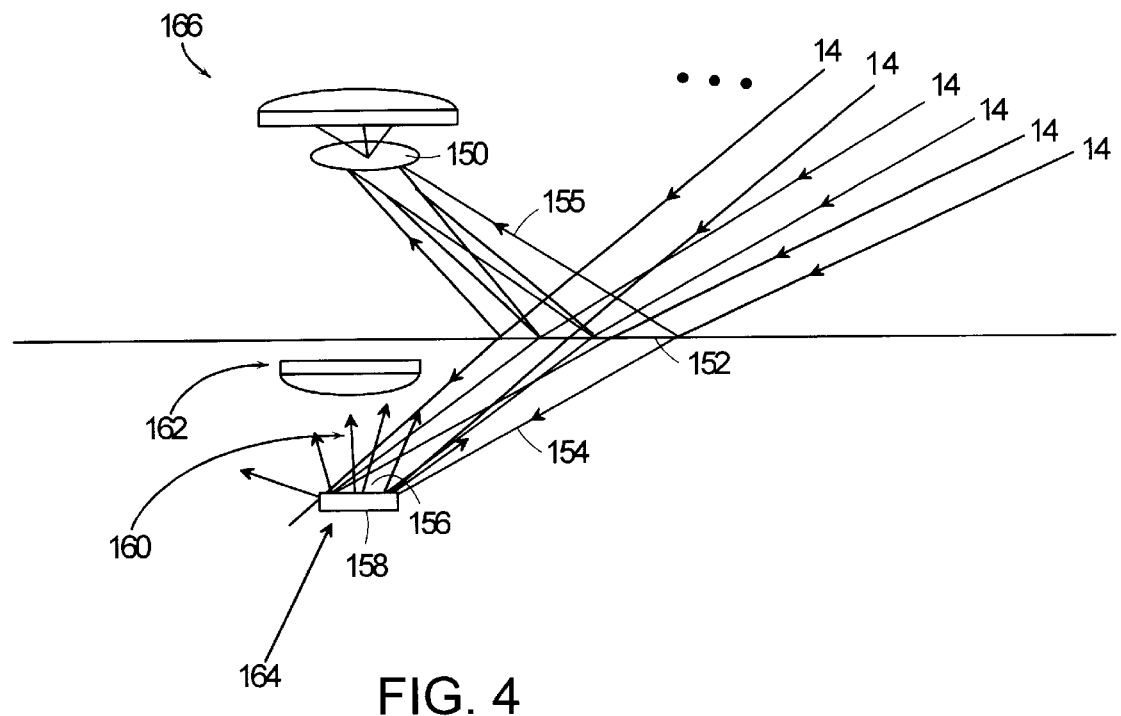
FIG. 4 illustrates the use of a pin hole aperture in the multiple beam pair optical scanner.

FIG. 4 illustrates the use of a pin hole aperture 150 in the multiple beam pair scanner. A beamsplitter 152 is positioned to split n beams 14 into a first set 154 and a second set 155. The first set 154 of n source beams 14 illuminates a point 156 on or near a sample 158. Light reflected from the sample 160 is received by a sample detector 162.

The second set 155 of n beams 14 is directed to the pin hole aperture 150 which is mounted in a line with the point 156 on or near the sample 158. A second detector 166 is positioned beyond the pin hole aperture 150 to receive a light signal that corresponds to a light signal that is received at the point 156 on or near the sample 158. A signal from the pinhole detector 166 includes the spatial-frequency-dependent phase offset of the light signal at the point 156 on or near the sample 158. Using the pin hole aperture 150 in the multiple beam pair scanner as shown in FIG. 4 is advantageous because it reduces the sensitivity of the multiple beam optical imaging scanner to mechanical vibration and drift.

The Fourier coefficients can be determined from the detector signal and from knowledge of the phase differences of the n source beams 14 by representing the detector signal as a linear system and solving for the complex Fourier coefficients. The detector signal can be represented in the form of T=Âx as follows:

$$T = \begin{bmatrix} 1 & C_{12}(1) & -E_{12}(1) & C_{13}(1) & -E_{13}(1) & \cdots & C_{(n-1)n}(1) & -E_{(n-1)n}(1) \\ 1 & C_{12}(2) & -E_{12}(2) & C_{13}(2) & -E_{13}(2) & \cdots & C_{(n-1)n}(2) & -E_{(n-1)n}(2) \\ & & & & \vdots & & & \\ 1 & C_{12}(m) & -E_{12}(m) & C_{13}(m) & -E_{13}(m) & \cdots & C_{(n-1)n}(m) & -E_{(n-1)n}(m) \end{bmatrix} \begin{bmatrix} A \\ D_{12} \\ F_{13} \\ \vdots \\ D_{(n-1)n} \\ F_{(n-1)n} \end{bmatrix}.$$

The number of time samples taken during a measurement is represented as m.

The detector signal, T, is determined from an actual measurement of the sample. The matrix coefficients $\hat{A}$ are determined from the known phase differences between the n beams 14. The information contained in x represents the sample in Fourier space and can be extracted using the formula $x = \hat{A}^+ T$ where $\hat{A}^+$ is the Moore-Penrose pseudoinverse of $\hat{A}$. Numerous other methods of solving linear systems can also be used.

Figure 5:
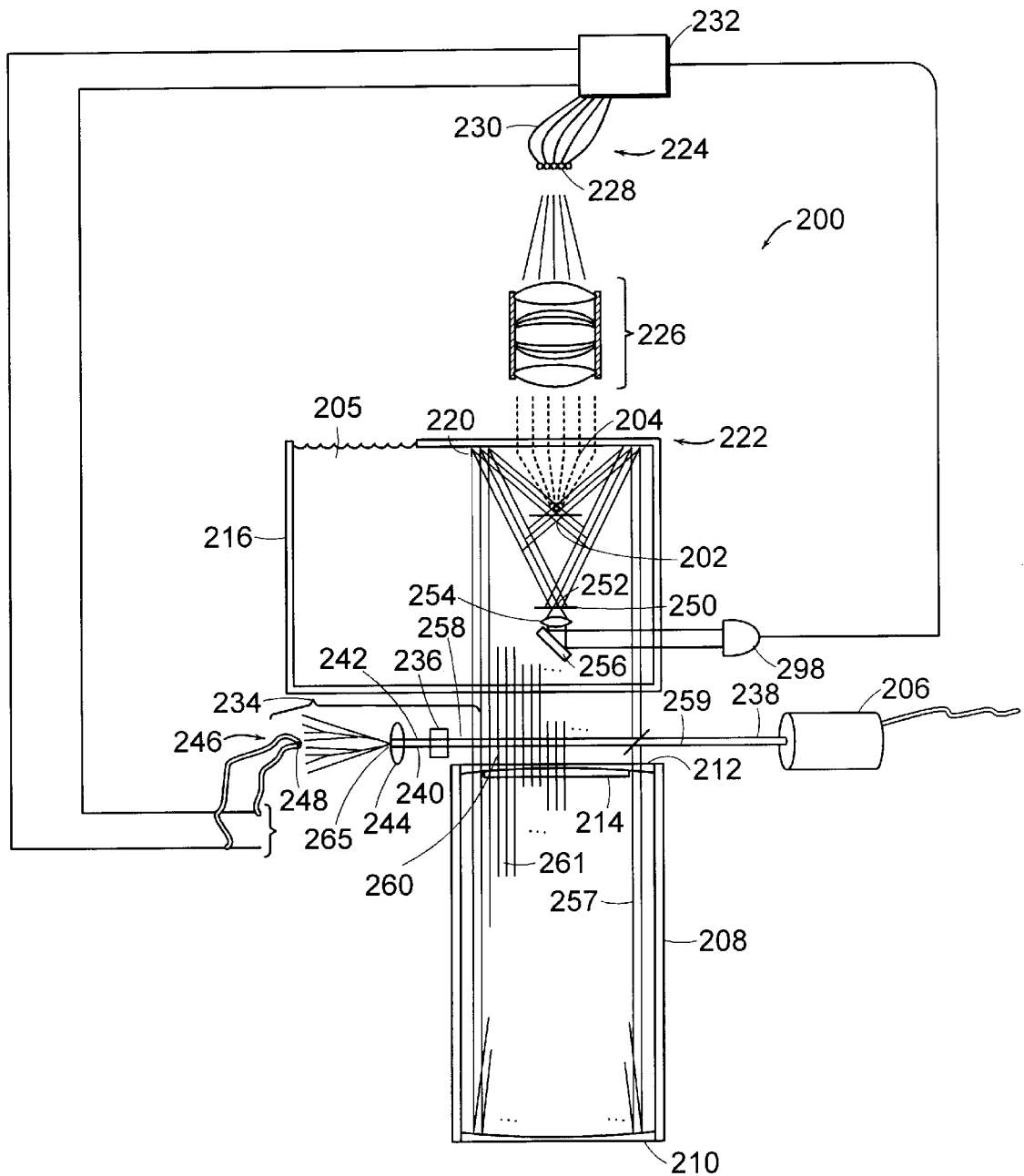
FIG. 5 illustrates a two-dimensional microscope using the multiple beam optical scanner that embodies the invention.

FIG. 5 illustrates a two-dimensional microscope 200 using the multiple beam optical scanner that embodies the invention. The microscope 200 includes a sample region 202 for mounting a sample 204. The sample 204 may be placed in a refractive index matching fluid 205 to reduce the refractive effects of the surface of the sample that would otherwise distort the speckle pattern generated by the microscope 200. The microscope 200 also includes a light source 206. The light source 206 may be a single-longitudinal mode laser diode with a natural linewidth or a laser coupled to a high-speed phase modulator. In addition, the microscope 200 includes a delay system 208. In one embodiment, the delay system 208 is an optical cavity including a first 210 and a second convex spherical mirror 212 and a graded beamsplitter 214.

The microscope 200 also includes a vessel 216 that contains a fluid 205 such as water or microscope immersion oil. Beam turning optics 220 are positioned at a top 222 of the vessel 216 to direct light from the vessel 216 to the sample region 202. In one embodiment, the light is directed from the vessel 216 to the sample region 202 by diffraction. The microscope 200 also includes a scattered light detector 224 which may include one or more imaging lenses 226 and an array of detectors 228 positioned at the focal plane of the imaging lenses for measuring the light scattering off of the sample 204. The output 230 of the scattered light detector array 224 is coupled to a data processor 232 that reconstructs the image of the sample 204.

The microscope 200 may include a reference interferometer 234, which is described above. The reference interferometer 234 includes a beamsplitter 236 that splits a beam 238 from the light source 206 into a first 240 and a second reference beam 242. The reference interferometer 234 also includes a lens 244 that magnifies a fringe pattern produced by the reference interferometer 234 and directs it onto a first 246 and a second detector 248, which are separated by a quarter of the fringe pattern's spatial period.

The microscope 200 may also include a pin hole aperture 250 positioned in a region of overlap 252 of the +1 order of the turning optics 220. A lens 254 and a mirror 256 collects the light transmitted through the pinhole aperture 250 and directs it to a pinhole detector 298 outside of the immersion vessel 216. The pin hole aperture 250 is preferably positioned within the vessel 216 to reduce the influence of aberrations from the vessel 216.

In operation, the light source 206 generates the beam 238 of light that is coupled into the optical cavity 208. The beam 238 is split into a first 257 and a second beam 258 by a beamsplitter 259. The first beam 257 is directed to the optical cavity 208. The optical cavity 208 generates n delayed copies of the first beam 257 that are directed into the vessel 216. The turning optics 220 are used to direct the n source beams so they overlap in the sample region 202. The graded beamsplitter 214 may be designed to give all the beams the same intensity when they arrive at the sample 204.

The second beam 258 is directed to the reference interferometer 234. The reference interferometer 234 uses the beamsplitter 260 to combine the second beam 258 with a delayed beam 261 from the cavity 208 to form a jittering fringe pattern in a region 265 where they overlap. The lens 244 magnifies the fringe pattern and directs it onto the first 246 and the second detector 248.

The data processor 232 records signals from scattered light detector 224, the first 246 and second detector 248 of the reference interferometer 234, and the pinhole detector 298. The data processor 232 then reconstructs an image of the sample.

Figure 6:
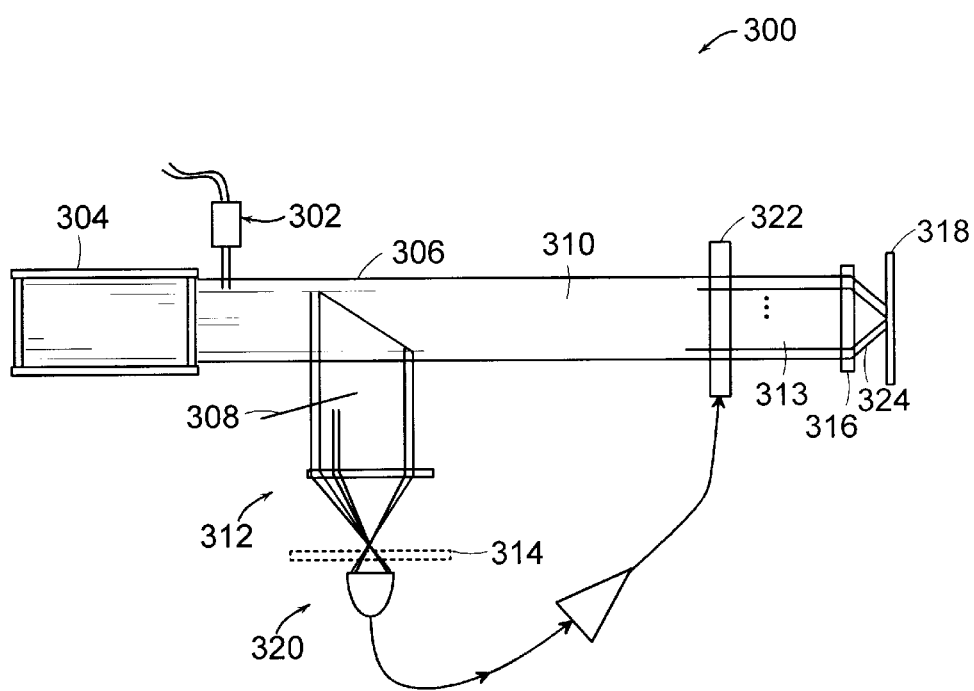
FIG. 6 illustrates a multiple beam pair optical projection scanner that embodies the invention.

FIG. 6 illustrates a multiple beam pair optical projection scanner 300 that embodies the invention. The projection scanner 300 is similar to the microscope described in connection with FIG. 5. The projection scanner 300 includes a light source 302 that may be a single-longitudinal mode laser diode. The light source 302 is coupled to an optical cavity 304 that generates n source beams.

A beamsplitter 306 is used to split the n source beams into a first 308 path and a second path 310. The projection scanner 300 also includes a first beam turning optic 312 that directs the n source beams to a mask 314 containing a pattern. A detector 320 is positioned to receive light passing through the mask 314. The output of the detector 320 is coupled to an electro-optic modulator 322 that is positioned in the second path 310 of the n source beams forming n modulated source beams 313. A second beam turning optic 316 is used to direct the n modulated source beams 313 so they overlap in a region 324 on the substrate 318 where the pattern on the mask 314 is to be reproduced.

In another embodiment, a processor (not shown) is used in place of the mask 314 and the detector 320. The processor communicates with electro-optic modulator 322 so as to modulate the n beams in a predetermined pattern.

The projection scanner 300 may be configured to reduce or magnify the image on the mask 314. For a given resolution, the projection scanner of FIG. 6 has a relatively large depth of field. Such a scanner is useful for projection lithography.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for providing metrologic information about an object, the method comprising the steps of:
   a) providing a plurality of radiation beams;
   b) illuminating the object with a modulated interference pattern, the modulated interference pattern comprising a plurality of interference patterns, each of the plurality of interference patterns generated by the interference between pairs of radiation beams in said plurality of radiation beams;
   c) detecting a characteristic of the radiation received from the object illuminated by the modulated interference pattern; and
   d) calculating metrologic information about the object in response to the modulated interference pattern and in response to the detected characteristic of the radiation received from the object.

2. The method of claim 1 wherein the characteristic detected in step c) comprises optical intensity.

3. The method of claim 1 wherein the characteristic detected in step c) comprises polarization.

4. The method of claim 1 wherein the characteristic detected in step c) comprises phase.

5. The method of claim 1 further comprising the step of reconstructing an image of the object from the metrologic information about the object.

6. The method of claim 1 further comprising the step of determining a parameter of the object from the metrologic information about the object.

7. The method of claim 1 wherein the step of illuminating the object with a modulated interference pattern comprises the step of time varying the modulated interference pattern.

8. The method of claim 1 wherein the radiation received from the object comprises the modulated interference pattern scattered by the object.

9. The method of claim 1 wherein the radiation received from the object comprises the modulated interference pattern transmitted by the object.

10. The method of claim 1 wherein the radiation received from the object is generated by the object.

11. The method of claim 10 wherein the radiation received from the object is fluorescence.

12. The method of claim 1 wherein the metrologic information about the object is calculated by a cross-correlation.

13. The method of claim 12 wherein the cross-correlation is performed by a matched filter.

14. The method of claim 1 wherein the metrologic information about the object is calculated by a transform.

15. The method of claim 1 wherein the metrologic information about the object is calculated by a matrix calculation.

16. The method of claim 15 wherein the matrix calculation comprises a pseudoinverse transform.

17. An apparatus for providing metrologic information about an object, the apparatus comprising:
   a) a source of radiation generating a plurality of radiation beams;
   b) a projector projecting a modulated interference pattern, the modulated interference pattern comprising a plurality of interference patterns, each of the plurality of interference patterns generated by the interference between pairs of radiation beams in said plurality of radiation beams;
   c) a detector detecting a characteristic of the radiation received from the object illuminated by the modulated interference pattern; and
   d) a processor in electrical communication with the detector, the processor calculating the metrologic information about the object in response to the modulated interference pattern and in response to the detected characteristic of the radiation received from the object.

18. The apparatus of claim 17 wherein the processor further reconstructs an image of the object from the metrologic information about the object.

19. The apparatus of claim 17 wherein the processor determines a parameter of the object from the metrologic information about the object.

20. The apparatus of claim 17 wherein the projector comprises a modulator that modulates at least one beam pair.

21. The apparatus of claim 20 wherein the modulator time varies the modulated interference pattern.

22. The apparatus of claim 17 wherein the projector comprises a delay generator for producing delayed copies of a beam.

23. The apparatus of claim 17 wherein the radiation received from the object comprises the modulated interference pattern scattered by the object.

24. The apparatus of claim 17 wherein the radiation received from the object comprises the modulated interference pattern transmitted by the object.

25. The apparatus of claim 17 wherein the radiation received from the object comprises radiation generated by the object.

26. The apparatus of claim 25 wherein the radiation received from the object comprises fluorescence radiation.

27. The apparatus of claim 17 wherein the processor calculates the metrologic information about the object using a cross-correlator.

28. The apparatus of claim 27 wherein the cross-correlator is a matched filter.

29. The apparatus of claim 17 wherein the processor calculates the metrologic information about the object using an inverse transform apparatus.

30. The apparatus of claim 29 wherein the inverse transform apparatus comprises a pseudoinverse transform apparatus.

31. The apparatus of claim 17 wherein the object includes a reference structure.

32. The apparatus of claim 17 wherein the detector comprises a plurality of detecting units.

33. The apparatus of claim 32 wherein the detecting units detect the radiation received from the object from a plurality of regions within the object.

34. A method of generating a second modulated interference pattern at a location comprising the steps of:
   a) providing a plurality of radiation beams;
   b) providing a first modulated interference pattern, the first modulated interference pattern comprising a plurality of interference patterns, each of the plurality of interference patterns generated by the interference between pairs of radiation beams in said plurality of radiation beams; and
   c) modulating the first modulated interference pattern in response to predetermined criteria to generate the second modulated interference pattern.

35. The method of claim 34 further comprising the step of combining a plurality of the second modulated interference patterns to form an image specified by the predetermined criteria.

36. The method of claim 34 further comprising the steps of:
   a) illuminating an object with the first modulated interference pattern; and
   b) detecting a characteristic of the radiation received from the object, wherein the step of modulating the first modulated interference pattern is in response to the first modulated interference pattern and in response to the detected characteristic of the radiation received from the object.

37. The method of claim 36 further comprising the step of combining a plurality of the second modulated interference patterns to form a scaled image of the object.

38. The method of claim 34 wherein the second modulated interference pattern is a modulated copy of the first modulated interference pattern scaled by a magnification coefficient.

39. An apparatus for generating a second modulated interference pattern at a location comprising:
   a) a source of radiation generating a plurality of radiation beams;
   b) a projector projecting a first modulated interference pattern, the first modulated interference pattern comprising a plurality of interference patterns, each of the plurality of interference patterns generated by the interference between pairs of radiation beams in said plurality of radiation beams; and
   c) a modulator modulating the first modulated interference pattern in response to the first modulated interference pattern and in response to predetermined criteria to generate the second modulated interference pattern.

40. The apparatus of claim 39 further comprising a receiver that receives a plurality of interference patterns.

41. The apparatus of claim 40 wherein the interference patterns comprise the first modulated interference patterns.

42. The apparatus of claim 40 wherein the interference patterns comprise the second modulated interference patterns.

43. The apparatus of claim 40 wherein the receiver comprises a photo-sensitive chemical receiver.

44. The apparatus of claim 40 wherein the receiver comprises a detector array.

45. The apparatus of claim 39 further comprising:
   a) a beamsplitter directing a portion of the first modulated interference pattern to an object; and
   b) a detector detecting a characteristic of the radiation received from the object,
      wherein the modulator modulates the first modulated interference pattern in response to the first modulated interference pattern and in response to the detected characteristic of the radiation received from the object.

\* \* \* \* \*

UNITED STATES PATENT AND TRADEMARK OFFICE
CERTIFICATE OF CORRECTION

PATENT NO. : 6,016,196
DATED : January 18, 2000
INVENTOR(S) : Michael S. Mermelstein It is certified that error appears in the above-identified patent and that said Letters Patent is hereby corrected as shown below:

<u>Column 1</u>,
Line 5, in place of "Number" insert --Numbers--
Line 5, after "F19628-95-C-0021" insert - and F30602-97-2-0106--
Line 5, after "the" insert --United States--
Line 6, after "Force" insert --(Rome)--

Signed and Sealed this

Seventeenth Day of July, 2001

*Attest:*

Nicholas P. Godici

NICHOLAS P. GODICI
*Attesting Officer*     *Acting Director of the United States Patent and Trademark Office*